United States Patent [19]

Deyrup et al.

[11] Patent Number: 5,627,236
[45] Date of Patent: May 6, 1997

[54] BONDING RESIN AND METHODS RELATING THERETO

[75] Inventors: Edward J. Deyrup, North East, Md.; Diane M. Hahm; Herbert V. Bendler, both of Wilmington, Del.

[73] Assignee: E. I. Du Pont de Nemours and Company, Wilmington, Del.

[21] Appl. No.: 569,377

[22] Filed: Dec. 8, 1995

Related U.S. Application Data

[63] Continuation of Ser. No. 390,145, Feb. 17, 1995, abandoned, which is a continuation of Ser. No. 57,072, May 4, 1993, abandoned.

[51] Int. Cl.$^6$ .................................................. C08L 67/02
[52] U.S. Cl. .................................. 525/173; 325/64; 325/174
[58] Field of Search ............................. 525/173, 174, 525/64

[56] References Cited

U.S. PATENT DOCUMENTS

| | | | |
|---|---|---|---|
| 2,901,460 | 8/1959 | Boldehuck | 260/46.5 |
| 3,305,604 | 2/1967 | Armstrong et al. | 260/860 |
| 3,950,206 | 4/1976 | Adachi et al. | 156/272 |
| 3,994,864 | 11/1976 | Buxbaum et al. | 260/75 N |
| 4,172,859 | 10/1979 | Epstein | 525/174 |
| 4,207,230 | 6/1980 | Bier et al. | 260/45.95 |
| 4,217,426 | 8/1980 | McConnell | 525/174 |
| 4,223,106 | 9/1980 | Bier et al. | 525/173 |
| 4,381,356 | 4/1983 | Marsh | 525/173 |
| 4,403,090 | 9/1983 | Smith | 528/272 |
| 4,478,907 | 10/1984 | Van Gossum et al. | 428/327 |
| 4,504,542 | 3/1985 | Miyoshi et al. | 428/336 |
| 4,564,541 | 1/1986 | Taira et al. | 428/35 |
| 4,601,926 | 7/1986 | Jabarin et al. | 428/35 |
| 4,622,268 | 11/1986 | Yatsu et al. | 428/480 |
| 4,692,506 | 9/1987 | Yatsu et al. | 528/296 |
| 4,705,707 | 11/1987 | Winter | 428/35 |
| 4,939,232 | 7/1990 | Fukuda et al. | 528/272 |
| 4,985,501 | 1/1991 | Udipi | 525/173 |

FOREIGN PATENT DOCUMENTS

| | | |
|---|---|---|
| 29788 | 6/1981 | European Pat. Off. . |
| 29620 | 6/1981 | European Pat. Off. . |
| 143640A | 6/1985 | European Pat. Off. . |
| 349960A | 1/1990 | European Pat. Off. . |
| 408042A | 1/1991 | European Pat. Off. . |
| 504522A2 | 9/1992 | European Pat. Off. . |
| 2004617 | 11/1969 | France .................. C08G 17/00 |
| 2311808 | 12/1976 | France .................. C08L 67/02 |
| 2535336A | 5/1984 | France . |
| 1694199 | 10/1971 | Germany . |
| 56061453 | 5/1981 | Japan . |
| 56061453 | 8/1981 | Japan .................. C08L 67/02 |
| 57032948 | 2/1982 | Japan . |
| 57042726 | 3/1982 | Japan . |
| 60-130643A | 4/1983 | Japan . |
| 61-241350A | 4/1986 | Japan . |
| 61135743A | 6/1986 | Japan . |
| 61-241350A | 9/1986 | Japan . |
| 61-241147A | 10/1986 | Japan . |
| 2171240A | 7/1990 | Japan . |
| 2202915A | 8/1990 | Japan . |
| 22202428A | 8/1990 | Japan . |
| 03039352A | 4/1991 | Japan . |
| 02300235A | 5/1991 | Japan . |
| 04033853A | 2/1992 | Japan . |
| 04105936A | 4/1992 | Japan . |
| 04146921A | 5/1992 | Japan . |
| 04146921A | 7/1992 | Japan . |
| 04153322A | 8/1992 | Japan . |
| 8104428 | 4/1982 | Netherlands . |
| 2071123B | 10/1983 | United Kingdom . |
| WO85/03718 | 8/1985 | WIPO .................. C08L 67/02 |
| WO8908558A | 9/1989 | WIPO . |
| WO9006384A | 7/1990 | WIPO . |
| WO9217531A1 | 10/1992 | WIPO . |

OTHER PUBLICATIONS

RD 215033 Anon Mar. 10, 1982.
RD 325097A Anon May 10, 1991.
RD 306033A Anon Oct. 10, 1989.

*Primary Examiner*—Patricia A. Short

[57] ABSTRACT

The present invention relates generally to multi-phase compositions comprising: 1. an aromatic/aliphatic copolyester substantially continuous phase; and 2. a low modulus polymeric substantially discontinuous phase. More specifically, these innovative multi-phase compositions have generally been found to provide high temperature viscosity stability and excellent long-term, heat seal and barrier properties.

4 Claims, No Drawings

BONDING RESIN AND METHODS RELATING THERETO

This is a continuation of application Ser. No. 08/390,145 filed Feb. 17, 1995, which was a continuation of application Ser. No. 08/057,072, filed May 4, 1993, both now abandoned.

FIELD OF THE INVENTION

The present invention relates generally to multi-phase compositions comprising: 1. an aromatic/aliphatic copolyester substantially continuous phase; and 2. a low modulus polymeric substantially discontinuous phase. More specifically, these innovative multi-phase compositions have generally been found to provide high temperature viscosity stability and excellent long-term, heat seal and barrier properties.

BACKGROUND OF THE INVENTION

Low glass transition temperature ("Tg") copolyester compositions are known generally. However, such compositions are generally not well suited for use as bonding resins in many packaging applications, because they tend to lack sufficient viscosity stability at processing temperatures common to the manufacture of polymeric packaging structures and the like, and they generally do not exhibit good physical aging (i.e., stable heat seals at low temperatures over time).

SUMMARY OF THE INVENTION

Overview

The present invention is directed to a novel multi-phase composition, comprising a particular type of copolyester continuous phase and a low modulus discontinuous phase. Useful elements of the present invention will be first discussed individually, and thereafter, combinations of such elements will be discussed, including methods relating thereto.

Copolyester Substantially Continuous Phase: Overview

The substantially continuous phase of the compositions of the present invention comprise a copolyester component derived from the following:

A. aromatic diacid (hereafter, monomer "A")

B. aliphatic diacid (hereafter, monomer "B");

C. glycol (hereafter, monomer "C"); and

D. optionally, comonomers other than monomers A, B, or C (hereafter, monomer "D").

Preferably:

1. about 50–95 mole percent of the acid comonomers are monomer A, more preferably 70–90 mole percent;

2. about 2–40 mole percent of the acid comonomers are monomer B, more preferably 4–14 mole percent; and 3. 90–100 mole % of the comonomers are monomer A, B and C.

The aromatic diacid (monomer A) preferably comprises one or two aromatic rings. Generally speaking, aromatic diacids having greater than two aromatic rings are difficult to polymerize and generally provide polymerization products which are difficult to extrude. Monomer A is preferably terephthalic, isophthalic, and/or naphthalaic dicarboxylic acid.

Monomer B is preferably a saturated aliphatic dicarboxylic acid, preferably containing about 5–12 carbon atoms, such as, adipic, sebacic, decane-1,10-dicarboxylic, succinic, glutaric, azelaic acid or derivatives thereof. The most preferred monomer B is azelaic acid, sebacic acid, adipic acid, dodecanedioic acid or their methylesters.

Monomer C is preferably 70–100 mole percent ethylene glycol and/or diethylene glycol with the balance, if any, being another glycol, such as:

propylene glycol,
1,3-propanediol,
2,4-dimethyl-2-ethylhexane-1,3-diol,
2,2-dimethyl-1,3-propanediol,
2-ethyl-2-butyl-1,3-propanediol,
ethyl-2-isobutyl-1,3-propanediol,
1,3-butanediol,
1,4-butanediol,
neopentyl glycol,
1,5-pentanediol,
1,6-hexanediol,
1,8-octanediol,
2,2,4-trimethyl-1,6-hexanediol,
thiodiethanol,
1,2-cyclohexanedimethanol,
1,3-cyclohexanedimethanol,
2,2,4,4-tetramethyl-1,3-cyclobutanediol
and the like.

Optionally, other comonomers (monomer D) can also be used, particularly multifunctional comonomers which provide crosslinking, such as:

trimellitic acid,
pentaerythritol,
glycerol,
trimethylol propane,
triethylol propane,
and the like.

Preferably, the loading of branching agent should be in the range of about 0–2 moles of branching agent per 100 moles of diacid, more preferably 0–1 moles per 100 moles of diacid. For embodiments in which crosslinking is desired, about 0.1–0.8 moles per 100 moles diacid is most preferred.

The copolyesters may be produced using conventional polyesterification procedures, such as is described, for example, in U.S. Pat. Nos. 3,305,604 and 2,901,460, the disclosures of which are incorporated herein by reference. Of course, esters of the acids (e.g., dimethyl terephthalate) may be used in producing the polyesters. It is also very desirable in the present invention for the intrinsic viscosity ("I.V.") of the polyester to be high (i.e., in the range of about 0.6–1.1). Preferably, the high I.V.'s are attained by melt phase polymerization which can be followed by conventional solid state polymerization.

Copolyester Continuous Phase: Critical Tg

The glass transition temperature ("Tg") of the final polymerization copolyester product is preferably in the range of about 35°–70° C., more preferably about 45°–65° C. and most preferably about 55°–62° C. Broadly speaking, each comonomer contributes to the Tg of the final polymerization product. The aromatic diacid (monomer A) is important in contributing to barrier properties, end use properties and the like, but monomer A also generally contributes toward a high Tg, and therefore, an unduly high concentration of monomer A can cause the Tg of the final polymerization product to be above the preferred ranges, making the heat seal temperature of the final composition undesirably high.

Hence, the aliphatic diacid (monomer B) is copolymerized with monomer A, since the presence of monomer B tends to provide polymerization products with lower Tgs and, surprisingly, also generally provides improved peel strength and improved aging (when used in combination with the discontinuous second phase component).

In addition to monomer B, monomer C can also be used to lower Tg, such as by the use of diethylene glycol ("DEG"). DEG is about one fifth as effective in lowering Tg, and therefore the same lowering of Tg of 1 mole percent of monomer B can be accomplished by incorporating about 6.4 mole percent DEG instead. Hence adjustment both to the DEG loading and monomer B loading can be made to adjust Tg to be within the above defined preferred ranges.

Other monomer B glycols can also be used to lower Tg, and it would be impossible to list every conceivable glycol which could be useful in adjusting Tg. The expert or inventive skill of the present invention relates to the understanding of the importance and need of copolymerizing monomers A, B, C and (optionally) D and also to the importance and need for the final composition to be within the above Tg ranges. Once this inventive or expert skill is provided to an ordinary artisan by the reading of this specification and accompanying claims, mere ordinary skill and experimentation are necessary in creating embodiments of the present invention, using other glycol combinations for monomer C, or indeed, other optional monomers (monomer D) to adjust Tg to the above defined ranges.

Any combination of the above monomers A, B, C and (optionally) D would be appropriate in the practice of the present invention, provided the final polymerization product has a Tg in the range of about 45°–65° C. The following formula attempts to approximate the Tg of the preferred final compositions (and requires that the Tg be between 40° and 70° C.), and this formula may be helpful in determining whether any particular combination of the above monomers is appropriate for the present invention:

$$40 \leq [68MF_t + 73MF_i + 125MF_n - 270MF_B - 42MF_C] \leq 70$$

wherein:
$MF_t$=mole fraction of terephthalic acid based upon total moles of acid
$MF_i$=mole fraction of isophthalic acid based upon total moles of acid
$MF_n$=mole fraction of naphthalaic acid based upon total moles of acid
$MF_B$=mole fraction of monomer B based upon total moles of acid
$MF_C$=mole fraction of monomer C based upon total moles of glycol.

Of course, chemistry is difficult to quantify mathematically and the above equation may not be 100% accurate in all instances. Further, where other aromatic acids are used other than terephthalic, isophthalic and/or naphthalaic, the above equation may be useful only as a rough approximation. Generally speaking, the greater the number of aromatic rings, the greater the tendency to raise the Tg of the final composition. Furthermore, where other glycols are used other than DEG, the above equation involving DEG may only provide a rough approximation relative to other glycols; generally speaking, glycols having a molecular weight much greater than DEG generally tend to lower Tg progressively less than DEG, and also, glycols having a molecular weight between ethylene glycol and DEG tend to approximate the Tg lowering effect of DEG. The above equation should provide the ordinary artisan with sufficient information to develop a broad range of compositions suitable for the present invention. As is typical under such circumstances, ordinary skill and experimentation may be necessary in developing any particular embodiment of the present invention.

Discontinuous Phase Component

The substantially discontinuous phase component of the present invention (when used in combination with the above defined copolyesters) generally provides improved bonding properties, particularly (heat seal) peel strengths-initially and after physical aging. The discontinuous phase component is preferably present in an amount of about 2–45 weight percent based upon the weight of the total composition, more preferably 2–35 and yet more preferably about 12–25 weight percent, and preferably, the discontinuous phase exists within the final composition as discrete particles having (on average) a median particle diameter of generally less than about 40 microns, more preferably less than about 10 microns and most preferably in the range of about 0.001 to about 2 microns. The secondary phase component preferable has a tensile modulus of less than about 150,000 pounds per square inch.

Preferably, the discontinuous phase material comprises sites which wet the continuous phase material. Also the ratio of tensile modulus of the continuous phase material to the tensile modulus of the discontinuous phase material is preferably greater than about 10 to 1, more preferably greater than 20 to 1.

The discontinuous phase material may be elastomeric or non-elastomeric. The material can be crosslinked, branched or straight chain. Useful comonomers in polymerizing useful discontinuous phase materials of the present invention (random or block polymerization), include:
1. ethylene;
2. carbon monoxide;
3. sulfur dioxide;
4. alpha, beta -ethylenically unsaturated carboxylic acids, particularly those having from 3 to 8 carbon atoms, and derivatives thereof;
5. dicarboxylic acids and anhydrides of the dicarboxylic acids;
6. metal salts of the monocarboxylic or dicarboxylic acids and the monoesters of such acids having from 0 to 100 percent of the carboxylic acid groups ionized by neutralization with metal ions, such as sodium or zinc;
7. dicarboxylic acids and monoesters of the dicarboxylic acids neutralized by amine-ended caprolactam oligomers or the like;
8. acrylate esters having from 4 to 22 carbon atoms;
9. vinyl esters of acids having from 1 to 20 carbon atoms,
10. vinyl ethers of 3 to 20 carbon atoms;
11. vinyl and vinylidene halides, and nitriles having from 3 to 6 carbon atoms;
12. unsaturated monomers having pendant hydrocarbon chains of 1 to 12 carbon atoms capable of being grafted with monomers having at least one reactive group;
13. unsaturated monomer taken from the class consisting of branched, straight chain and cyclic compounds having from 4 to 14 carbon atoms;
14. and the like Illustrative of above described monomers include:
maleic acid,
maleic anhydride,
maleic acid monoethyl ester,
metal salts of acid monoethyl ester,
fumaric acid,
fumaric acid monoethyl ester,
itaconic acid,
vinyl benzoic acid, vinyl phthalic acid,
metal salts of fumaric acid monoethyl ester,
monoesters of maleic, fumaric, or itaconic acids
glycidyl methacrylate,
glycidyl acrylate,
alkyl glycidyl ether,
vinyl glycidyl ether,
glycidyl itaconate,
phthalic anhydride sulfonyl azide,
methyl ester and monooctadecyl ester of phthalic anhydride sulfonyl azide,
benzoic acid sulfonyl azide,
naphthoic acid sulfonyl azide,
naphthoic diacid sulfonyl azide,
R-monoesters (and metal salts thereof) of phthalic acid and naphthoic diacid sulfonyl azide,
vinyl ethers,
vinyl benzoate,
vinyl naphthoate,
vinyl esters of R-acids, where R is up to 18 carbon atoms,
vinyl chloride,
vinylidene fluoride,
styrene,
propylene,
isobutylene,
vinyl naphthalene,
vinyl pyridine,
vinyl pyrrolidone,
mono-, di-, trichloro styrene,
R'-styrene where R' is 1 to 10 carbon atoms,
butene,
hexene,
octene,
decene,
hexadiene,
norbornadiene,
butadiene,
isoprene,
divinyl, alkyl styrene
and the like.

Useful discontinuous phase compositions include the following substantially alternating or substantially random copolymers:

1. ethylene/n-butyl acrylate/methacrylic acid, ethylene/n-butyl acrylate/glycidyl/methacrylic acid or ethylene/methyl acrylate/monoethyl ester of maleic anhydride or 0 to 100 percent neutralized zinc, sodium, calcium, lithium, antimony, and potassium salts thereof;
2. ethylene/methyl acrylate, ethylene/methacrylic acid or ethylene/acrylic acid;
3. ethylene/isobutyl acrylate/methacrylic acid;
4. ethylene/methyl acrylate/monoethyl ester of maleic anhydride or zinc or sodium salts thereof;
5. ethylene/methyl acrylate/methacrylic acid and zinc salts thereof;
6. ethylene/vinyl acetate/methacrylic acid and zinc salts thereof;
7. ethylene/methyl methacrylate/methacrylic acid and zinc salts thereof;
8. ethylene/vinyl acetate/carbon monoxide;
9. ethylene/isobutyl acrylate and a zinc salt of ethylene/isobutyl acrylate/methacrylic acid;
10. ethylene/isobutyl acrylate/carbon monoxide;
11. ethylene/stearyl methacrylate/carbon monoxide;
12. ethylene/n-butyl acrylate/carbon monoxide;
13. ethylene/2-ethyl hexyl methacrylate/carbon monoxide;
14. ethylene/methyl vinyl ether/carbon monoxide;
15. ethylene/vinyl acetate/maleic anhydride;
16. ethylene/vinyl acetate monoethyl ester of maleic anhydride;
17. ethylene/vinyl acetate/glycidyl methacrylate;
18. ethylene/propylene/1,4 hexadiene-g-maleic anhydride;
19. ethylene/propylene/norbornadiene/1,4 hexadiene-g-benzoic acid sulfonyl azide;
20. ethylene/propylene/1,4 hexadiene-g-phthalic anhydride sulfonyl azide;
21. ethylene/propylene/1,4 hexadiene-g-maleic anhydride;
22. ethylene/propylene/1,4 hexadiene-g-maleic anhydride neutralized with amine ended oligomer of caprolactam;
23. ethylene/propylene/1,4 hexadiene/maleic anhydride neutralized with zinc rosinate;
24. ethylene/propylene/1,4 hexadiene-g-fumaric acid;
25. ethylene/propylene/1,4 hexadiene/norbornadiene-g-maleic anhydride;
26. ethylene/propylene/1,4 hexadiene/norbornadiene-g-monoethyl ester of maleic anhydride;
27. ethylene/propylene/1,4 hexadiene/norbornadiene-g-fumaric acid;
28. ethylene/propylene/1,4 hexadiene/glycidyl methacrylate;
29. ethylene/propylene/1,4 hexadiene/norbornadiene-g-phthalic anhydride sulfonyl azide;
30. isobutylene/isoprene-g-phthalic anhydride sulfonyl azide;
31. poly(isobutylene)-g-phthalic anhydride sulfonyl azide;
32. isoprene/phthalic anhydride;
33. natural rubber;
34. ethylene/monoethyl ester of maleic anhydride;
35. butyl acrylate/monoethyl ester of fumaric acid;
36. ethyl acrylate/fumaric acid;
37. epichlorohydrin/ethylene oxide;
38. ethylene/propylene-g-phthalic anhydride sulfonyl azide;
39. ethylene/propylene/5-ethylidine-2-norbornene-fumaric acid;
40. ethylene/propylene/dicyclopentadiene-g-monoethyl ester of maleic acid;
41. ethylene/propylene/5-propenyl-2-norbornene-g-maleic anhydride;
42. ethylene/propylene/tetrahydroindene-g-fumaric acid;
43. ethylene/propylene/1,4-hexadiene/5-ethylidiene-2-norbornene-g-fumaric acid;
44. ethylene/vinyl acetate/CO/glycidyl methacrylate;
45. ethylene/vinyl acetate/CO/glycidyl acrylate,
46. ethylene/methyl acrylate/glycidyl methacrylate;
47. ethylene/methyl acrylate/glycidyl acrylate;
48. acrylic rubbers;
49. and the like.

Another useful second phase material is a core-shell type polymer having a polymer core and a polymer shell, wherein the core and shell have been substantially chemically grafted together. The shell and core are preferably prepared sequentially by emulsion polymerization. The core preferably has a weight average molecular weight of greater than about 8,000 and the shell preferably has a weight average molecular weight of about 5,000 to about 100,000 as determined by gel permeation chromatography. Preferred such compositions include those polymerized from monomers selected from: methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, acrylic acid, methacrylic acid, itaconic acid, maleic acid, fumaric acid, acrylic anhydride, methacrylic anhydride, maleic anhydride, itaconic anhydride, fumaric anhydride, styrene, substituted styrene, butadiene, vinyl acetate, other $C_1$ to $C_{12}$ alkyl acrylates and methacrylate, and the like. Preferably, the glass transition temperature of the core is about –65° C. to about 100° C., and the glass transition temperature of the shell is greater than about 100° C. Preferred such compositions are available from the AmeriHaas Corporation under the trademark "PARALOID."

Continuous Phase+Discontinuous Phase

Mixing of the two components can be accomplished by a variety of melt compounding devices as known to those of ordinary skill in the art, i.e., high shear equipment or conventional single screw extruders at a temperature sufficient to cause the component to melt flow. In the most preferred embodiment, the compounding temperature of the compositions of the present invention should be less than about 270° C., more preferably less than about 265° C., and the extrusion temperature of the final material should be less than about 280° C., more preferably less than about 260° C. and more preferably less than about 250° C. Since the viscosity is highly shear sensitive, the compositions of the invention are well suited for extrusion applications. Alternatively, pre-compounding may not be necessary and the extrusion can be conducted in a single step, direct fabrication. In yet another embodiment, the second component can be added immediately after polymerization and before pellitization by injecting the second component into the polyester melt stream and then mixing by static mixers.

The compositions of this invention can be prepared by melt blending, in a closed system, the continuous phase material with the discontinuous phase material in a multi-screw extruder such as a Werner Pfleiderer extruder having generally 2-5 kneading blocks and at least one reverse pitch to generate high shear, or other conventional plasticating devices such as a Brabender, Banbury mill, or the like.

Alternatively, the blends may be made by coprecipitation from solution, blending or by dry mixing together of the components followed by melt fabrication of the dry mixture by extrusion. The components can be dry blended and extruded under vacuum 5° to 100° C. above the melting point of the matrix resin, preferably 310° C. or below. The extrudate can be cooled in a water bath, cut, and vacuum dried.

Alternatively, the ingredients can be added as a dry blend to a conventional extruder (i.e., single screw), such as by using the converting equipment extruders of a conventional converter. Such direct fabrication is advantageous, since it does not require pre-compounding.

Of course, many process variations are possible. It may be desirable to form a concentrate of the two phase composition. This is accomplished by admixing the continuous phase material in higher concentrations based on the weight of total composition, e.g., up to about 50 percent by weight, with the discontinuous phase material. Additional continuous phase material is admixed with the composition to yield the desired concentrate.

Other Additives

The compositions of the present invention may be modified by one or more conventional additives such as stabilizers and inhibitors of oxidative, thermal, and ultraviolet light degradation; lubricants and mold release agents, colorants including dyes and pigments, particulate fillers, nucleating agents, etc.

The stabilizers can be incorporated into the composition at any stage in the preparation of the thermoplastic composition. Preferably the stabilizers are included early to preclude the initiation of degradation before the composition can be protected. Such stabilizers must be compatible with the composition.

Viscosity stabilizers such as polycarbodiimides may be used. The oxidative and thermal stabilizers useful in the materials of the present invention include those used in addition polymers generally. They include, for example, hindered phenols, hydroquinones, and varieties of substituted members of those groups and combinations thereof.

The ultraviolet light stabilizers, e.g., up to 2.0 percent, based on the weight of matrix resin, can also be those used in addition polymers generally. Examples of ultraviolet light stabilizers include various substituted resorcinols, salicylates, benzotriazoles, benzophenones, and the like.

Suitable lubricants and mold release agents, e.g., up to 1.0 percent, based on the weight of the composition, are polyethylene waxes and the like.

Other useful additives may include:
1. pigments, e.g., titanium dioxide, cadmium sulfide, cadmium sulfide selenide, phthalocyanines, ultramarine blue, carbon black, etc.,
2. nucleating agents, e.g., talc, calcium fluoride, sodium fluoride, alumina, and finely divided polytetrafluoroethylene, etc.,
3. colorants (dyes and pigments),
4. polyethylene;
5. and the like.

Structures

In the most preferred embodiment, the final resin composition is extruded into a multi-layer sheet, film or the like (including extrusion coating onto a substrate or the like). Generally, non-oriented films of the present composition are preferred, although depending upon the particular application, orientation may be advantageous. Generally speaking, any conventional treatment can be conducted on the film which is conventional for polyester or copolyester films, such as corona surface treatment or the like.

Improved Aging

In numerous embodiments of the present invention, improved aging has been observed. Generally, with a heat seal bar temperature of about 225° F. (0.5 second dwell, 40 psig, 1 inch seal bar with a 48 gauge oriented poly (ethylene terphthalate) slip sheet, using a Sentinel™ sealer), the resulting heat seal is capable of withstanding a peel force of about 500 grams per inch for at least 50 days, oftentimes at least 100 days. Embodiments which exhibit improved aging are provided in the Examples.

DETAILED DESCRIPTION OF THE PREFERRED EMBODIMENT AND BEST MODE

EXAMPLES

EQUIPMENT: The following equipment was used in conducting the examples provided herein:
1. compounding equipment: 30 mm twin screw extruder, barrel temperature were all about 230° C. where the feed temperature was about 200° C.,
2. extrusion equipment: 1.5 inch Davis-Standard™ extruder with a general purpose screw through a 2 inch Killion™ blown film die and conventional roller collapsing frame,
3. drying equipment: Hopper dryer and/or conventional electric drying lab oven, 4. heat sealer: Sentinel™ heat sealer with a heat seal bar temperature of about 225° F. (0.5 second dwell, 40 psig, 1 inch seal bar with a 48 gauge oriented poly (ethylene terphthalate) slip sheet),
5. peel strength: heat seals are tested using an Instron™ tensile tester (run at 12 inches per minute crosshead speed),
6. conditioning room: controlled storage space at a relative humidity of 80% and a temperature of about 85° F.

COMPOSITIONS (all percentages are mole percent, unless specified otherwise; mole percentages were determined using nuclear magnetic resonance):

Copolyester 1:
  95.25% terephthalic acid,
  4.75% azelaic acid,
  71.5% ethylene glycol, and
  28.5% diethylene glycol,
Copolyester 2:
  92.9% terephthalic acid,
  7.1% azelaic acid,
  93.8% ethylene glycol, and
  6.2% diethylene glycol,
Copolyester 3:
  93.9% terephthalic acid,
  6.1% azelaic acid,
  91.5% ethylene glycol, and
  8.5% diethylene glycol.

2nd Phase Composition: ethylene/methacrylic acid copolymer comprising about 85% ethylene and 15% methacrylic acid and neutralized with sufficient amount of zinc to provide about 58% neutralization of the available acid sites.

| Antioxidant: | Irganox 1010 ™ |
| --- | --- |
| Sample 1: | Copolyester 1 (84.6 wt %) |
|  | 2nd Phase Composition (15 wt. %) |
|  | Antioxidant (0.4 wt %) |
| Sample 2: | Copolyester 2 (84.6 wt %) |
|  | 2nd Phase Composition (15 wt. %) |
|  | Antioxidant (0.4 wt %) |
| Sample 3: | Copolyester 2 (84.6 wt %) |
|  | 2nd Phase Composition (15 wt. %) |
|  | Antioxidant (0.4 wt %) |

PROCEDURE: The following procedure was used for each sample:
1. the copolyester was dried to a moisture level less than about 0.01 weight percent using the drying equipment defined above (drying occured for at least 8 hours at 275° F. with a dew point of less than −10° F.);
2. the copolyester composition was dry blended with antioxidant and the second phase material using the compounding equipment identified above;
3. the resulting blend was extruded into a film using the extrusion equipment identified above; and
4. the heat seal of the resulting film was tested using the conditioning room and equipment identified above.

RESULTS:

| Time | Aged Peel Strength (grams/square inch) | | | |
| --- | --- | --- | --- | --- |
| (days) | 175° F.[1] | 200° F.[1] | 225° F.[1] | 250° F.[1] |
| SAMPLE 1 -- 1st Peel Test | | | | |
| 0 | — | | 2118 | |
| 42 | | 2210 | 2190 | 2279 |
| 70 | | 2068 | 2194 | 2215 |
| 91 | | 148* | 1896 | 2094 |
| SAMPLE 1 -- 2nd Peel Test | | | | |
| 0 | | 2029 | 2362 | |
| 7 | | 1454 | 2120 | |
| 14 | | 2064 | 1800 | |
| 21 | | 886 | 1676 | |
| 28 | | 67* | 1234 | |
| COPOLYESTER 2 -- Peel Test | | | | |
| 0 | 108* | 602 | 1679 | 1276 |
| 14 | 35* | 97* | 1280 | 1214 |
| 28 | 26* | 41* | 269* | 335* |
| 56 | 11* | 15* | 83* | 91* |
| SAMPLE 2 -- Peel Test | | | | |
| 0 | 31* | 186* | 1857 | 1555 |
| 14 | 31* | 447* | 838 | 1529 |
| 28 | 23* | 42* | 1146 | 882 |
| 56 | 11* | 20* | 1282 | 552 |
| SAMPLE 3 -- Peel Test[2] | | | | |
| 0 | 29* | 1592 | 1767 | 1996 |
| 14 | 8* | 30* | 1661 | 1957 |
| 28 | 2* | 16* | 1289 | 1597 |
| 56 | 13* | 37* | 787 | 1818 |
| SAMPLE 3 - Peel Test[2] | | | | |
| 0 | 25* | 377* | 2128 | 1563 |
| 14 | 8* | 33* | 656 | 2414 |
| 28 | 2* | 10* | 240* | 898 |
| 56 | 12* | 10* | 55* | 1485 |

[1]Seal Bar Temperature
[2]Film Making Temperature of 525° F.
*Failure (less than 500 grams per inch peel strength)

What is claimed is:

1. A multi-phase heat sealing composition comprising:
   a) 55–98 weight percent (based upon 100 weight percent of the multi-phase composition) of a copolyester continuous phase having a glass transition temperature ("Tg") in the range of about 35°–70° C., the copolyester being derived from:
      1. 50–95 mole percent (based upon 100 mole percent diacid) of an aromatic diacid from the group consisting of: terephthalic acid, isophthalic acid, naphthalaic dicarboxylic acid and mixtures thereof (hereafter, "Monomer A");
      2. 2–40 mole percent (based upon 100 mole percent diacid) of a saturated aliphatic dicarboxylic acid from the group consisting of dicarboxylic acids containing from 5 to 12 carbon atoms and mixtures thereof (hereafter, Monomer B);
      3. 60 to about 94 mole percent (based upon 100 mole percent diol) of a ethylene glycol and the balance being diethylene glycol (hereafter, Monomer C);
   wherein the copolyester is derived only from Monomer A, Monomer B, Monomer C and 0–2 moles of a branching agent per 100 moles diacid,
   b) 2–45 weight percent (based upon the weight of the multi-phase composition) of a substantially discontinuous phase comprising a low modulus ethylene copolymer.

2. The composition of claim 1, wherein Monomer B is azelaic acid, sebacic acid, dodecanedioic acid, adipic acid or a mixture thereof.

3. The composition of claim 1, wherein the copolyester comprises a branching agent which is a member of the group consisting of trimellitic acid, pentaerythritol, glycerol, trimethylol propane, triethylol propane, and mixtures thereof.

4. The composition of claim 1, wherein the Tg of the copolyester is in the range of 45°–65° C.

* * * * *